US 9,191,387 B2

(12) United States Patent
Kurokawa et al.

(10) Patent No.: US 9,191,387 B2
(45) Date of Patent: Nov. 17, 2015

(54) COMMUNICATION SYSTEM FOR CHECKING FOR UNAUTHORIZED USE OF A TERMINAL

(75) Inventors: Osamu Kurokawa, Minato-ku (JP); Kazuki Eguchi, Minato-ku (JP); Naoki Yoshida, Minato-ku (JP); Shunsuke Yokouchi, Minato-ku (JP); Toru Shiiba, Minato-ku (JP); Yasuyuki Ueda, Minato-ku (JP); Tomiharu Hamaguchi, Minato-ku (JP); Yasuhiro Watanabe, Minato-ku (JP); Hiroaki Akiyama, Minato-ku (JP); Takayuki Kido, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 932 days.

(21) Appl. No.: 13/377,742

(22) PCT Filed: Jul. 20, 2010

(86) PCT No.: PCT/JP2010/062181
§ 371 (c)(1),
(2), (4) Date: Jun. 22, 2012

(87) PCT Pub. No.: WO2011/010640
PCT Pub. Date: Jan. 27, 2011

(65) Prior Publication Data
US 2012/0258686 A1    Oct. 11, 2012

(30) Foreign Application Priority Data

Jul. 21, 2009    (JP) .................................. 2009-170139

(51) Int. Cl.
*H04L 29/06*    (2006.01)
*H04W 12/06*    (2009.01)
(Continued)

(52) U.S. Cl.
CPC .......... *H04L 63/0876* (2013.01); *H04W 12/06* (2013.01); *H04W 12/08* (2013.01); *H04W 8/26* (2013.01); *H04W 84/045* (2013.01)

(58) Field of Classification Search
CPC .. H04L 63/0876; H04W 12/06; H04W 12/08; H04W 84/045; H04W 8/26
USPC ........... 455/411, 428, 435.1, 410, 562.1, 433, 455/439; 370/331, 401, 467; 709/227
See application file for complete search history.

(56) References Cited

U.S. PATENT DOCUMENTS 6,285,882 B1 * 9/2001 Cornillat et al. ........... 455/435.1
7,457,638 B2 * 11/2008 Dhillon et al. ............. 455/562.1
(Continued)

FOREIGN PATENT DOCUMENTS

CN    101171856 A    4/2008
CN    101422065 A    4/2009
(Continued)

OTHER PUBLICATIONS

Japanese Office Action dated Jul. 2, 2013 issued in corresponding Japanese Patent Application No. 2009-170139.
(Continued)

*Primary Examiner* — Marisol Figueroa
(74) *Attorney, Agent, or Firm* — Sughrue Mion, PLLC

(57) ABSTRACT

A femto cell base station includes a generating part that generates a SIP message including a terminal ID of a radio terminal and a check request for the terminal ID at a predetermined time, and a first transmitting part that transmits the SIP message generated by the generating part to a higher level apparatus in the communication system.

6 Claims, 18 Drawing Sheets

(51) Int. Cl.
*H04W 12/08* (2009.01)
*H04W 8/26* (2009.01)
*H04W 84/04* (2009.01)

(56) References Cited

U.S. PATENT DOCUMENTS

| | | |
|---|---|---|
| 2005/0070283 A1 | 3/2005 | Hashimoto et al. |
| 2006/0258394 A1 | 11/2006 | Dhillon et al. |
| 2007/0054668 A1 | 3/2007 | Scheinert et al. |
| 2007/0173251 A1* | 7/2007 | Vikberg et al. ............... 455/428 |
| 2008/0167035 A1* | 7/2008 | Buckley et al. ............ 455/435.1 |
| 2008/0188221 A1 | 8/2008 | Hashimoto et al. |
| 2008/0304494 A1 | 12/2008 | Yokoyama |
| 2009/0129372 A1* | 5/2009 | Pandey et al. .................. 370/352 |
| 2010/0274908 A1* | 10/2010 | Koskelainen ................. 709/227 |
| 2013/0331065 A1* | 12/2013 | Osborn ......................... 455/411 |

FOREIGN PATENT DOCUMENTS

| | | |
|---|---|---|
| JP | 2005-109570 A | 4/2005 |
| JP | 2007-534227 A | 11/2007 |
| JP | 2008-172794 A | 7/2008 |
| JP | 2008-541617 A | 11/2008 |
| JP | 2008-544608 A | 12/2008 |
| JP | 2009-504051 A | 1/2009 |
| JP | 2010-154508 A | 7/2010 |
| WO | WO 2005/065214 A2 | 7/2005 |
| WO | WO 2006/124291 A1 | 11/2006 |
| WO | WO 2006/135542 A2 | 12/2006 |
| WO | WO 2007/015075 A1 | 2/2007 |
| WO | WO 2010/010800 A2 | 1/2010 |

OTHER PUBLICATIONS

Communication dated Jul. 21, 2014 from the People's Republic of China's Patent Office in counterpart Chinese application No. 201080032418.0.

Office Action, dated Dec. 10, 2013, issued by the State Intellectual Property of the People's Republic of China, in counterpart Application No. 201080032418.

* cited by examiner

Fig.3

| | Body FemtoAP→IMS-CN | | |
|---|---|---|---|
| 00 | TransactionNumber "00 00 00 00" Initial | | |
| 00 | | | |
| 00 | | | |
| 00 | | | |
| 0e | TI="0" | Protocol Discriminator (e:CheckIMEI) | |
| 01 | CheckIMEI MessageType (0x01:CheckIMEI Request) | | |
| 17 | Mobile Identity IEI | | |
| 09 | Mobile Identity Length | | |
| 13 | digit1(TAC) | Odd /even | Type of identity=3(IMEISV) |
| 32 | digit3(TAC) | digit2(TAC) | |
| 54 | digit5(TAC) | digit4(TAC) | |
| 76 | digit7(TAC) | digit6(TAC) | |
| 98 | digit9(TAC) | digit8(TAC) | |
| 10 | digit11(TAC) | digit10(TAC) | |
| 32 | digit13(TAC) | digit12(TAC) | |
| 54 | digit15(TAC) | digit14(TAC) | |
| f6 | | digit16(TAC) | |

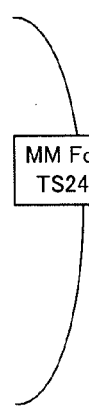

MM Format TS24.008

Fig.4

|  | Check IMEI |
|---|---|
| R-URI | sip:IP-SM-GW@operator.com |
| PPI header | sip-uri:IMSI@...<br>cpc=notification |
| Content-Type | application/vnd.3gpp.adtap |
| Body(format) | text |
| Body(content) | contain signals AFTER TI, from Protocol Discriminator.<br>TI(Transaction ID) from UE<br>→Femto AP is restricted in Femto AP.<br>TI(Transaction ID) from CN<br>→Femto AP will be any value (ie "0000").<br>Set IMEISV in User Data.<br><br>If the RLC value in SIP:MESSAGE means "Black" ,FAP set the CV#6:IllegalME<br>In LocUp-Reject. And FAP send SIP:de-REGISTER to CN. |

Fig.5

| | IMS-Femto NETWORK | | EXISTING 3G NETWORK CORE | |
|---|---|---|---|---|
| MOVE FROM Macro TO Femto | ○ TRANSMIT Check IMEI | MOVE FROM Femto TO Macro | ○ TRANSMIT Check IMEI |
| MOVE FROM Femto TO Femto IN IMS | ○ TRANSMIT Check IMEI (REG ON SIDE OF newFemto IS HANDLED AS INITIAL POSITION REGISTRATION) | MOVE FROM BTS TO BTS IN MSC | × NOT TRANSMIT Check IMEI (BECAUSE IT IS DETERMINED THAT IMEISV ON VLR IS NOT CHANGED) |
| — | (NO OTHER IMS-Femto NETWORK, AND NO MOVE FROM Femto TO Femto BETWEEN IMS AND CN) | MOVE FROM BTS TO BTS BETWEEN MSC AND MSC | ○ TRANSMIT Check IMEI |
| POWER OFF/ON IN IMS | ○ TRANSMIT Check IMEI (deREG TO REG IS HANDLED AS INITIAL POSITION REGISTRATION) | POWER OFF/ON IN MSC | × NOT TRANSMIT Check IMEI (BECAUSE IT IS DETERMINED THAT IMEISV ON VLR IS NOT CHANGED) |
| EQUIPMENT REPLACEMENT IN IMS (INCLUDING POWER OFF/ON) | ○ TRANSMIT Check IMEI (deREG TO REG IS HANDLED AS INITIAL POSITION REGISTRATION) | EQUIPMENT REPLACEMENT IN MSC (INCLUDING POWER OFF/ON) | ○ TRANSMIT Check IMEI (BECAUSE OF DIFFERENT IMEISV ON VLR) |

Fig.6

| Case | | HSS or IP-SM-GW ⇒ FemtoAP | | FemtoAP ⇒ UE | AP ⇒ IMS |
|---|---|---|---|---|---|
| | | Component Type | Error Code / Problem Code | | IMS ⇒ HLR |
| #1 | NORMAL RESPONSE FROM EIR (White/Gray) | 0xa2 : Return Result | – | Location Update Accept | – |
| #2 | NORMAL RESPONSE FROM EIR (Black) | 0xa2 : Return Result | – | Location Update Reject (MM.CV#6: Illegal ME) | deREG /Purge |
| #3 | RECEIVE U-Error FROM EIR | 0xa2 : Return Result | – | Location Update Accept | – |
| #4 | MAP RESPONSE WAITING TIMEOUT | 0xa2 : Return Result | – | Location Update Accept | – |
| #5 | SIP RESPONSE WAITING TIMEOUT | – | | Location Update Accept | – |
| #6 | RECEIVE SIP-Error | 503 Service Unavailable | | Location Update Accept | – |

Fig.8

| | Body FemtoAP←IMS-CN | |
|---|---|---|
| xx | TransactionNumber "xx xx xx xx" | |
| xx | | |
| xx | | |
| xx | | |
| 0e | TI="0" | Protocol Discriminator(e:CheckIMEI) |
| xx | CheckIMEI MessageType (0x02) | |

0x02:CheckIMEI Accept(White/Grey)
0x03:CheckIMEI Reject(Black)

Fig.10

|   | Body FemtoAP←IMS-CN | |
|---|---|---|
| xx | TransactionNumber "xx xx xx xx" | |
| xx | | |
| xx | | |
| xx | | |
| 0e | TI="0" | Protocol Discriminator(e:CheckIMEI) |
| xx | CheckIMEI MessageType (0x03) | |

0x02:CheckIMEI Accept(White/Grey)
0x03:CheckIMEI Reject(Black)

COMMUNICATION SYSTEM FOR CHECKING FOR UNAUTHORIZED USE OF A TERMINAL

CROSS REFERENCE TO RELATED APPLICATIONS

This application is a National Stage of International Application No. PCT/JP2010/062181 filed Jul. 20, 2010, claiming priority based on Japanese Patent Application No. 2009-170139, filed Jul. 21, 2009, the contents of all of which are incorporated herein by reference in their entirety.

TECHNICAL FIELD

The present invention relates to a femto cell base station, a gateway system and a MAP gateway (GW) apparatus used in a communication system that checks for unauthorized use of a terminal as a measure against theft of a radio terminal (UE; user equipment), for example, a communication system, a communication method, a communication apparatus, and programs therefor.

BACKGROUND ART

In general, in a 3G (third generation) network provided as a public mobile communication network that establishes call connections among cellular phones or other UEs, a subscriber ID (IMSI: international mobile subscriber identity) for identifying a subscriber and a terminal ID (IMEI: international mobile equipment identifier) for identifying a radio terminal are set.

The IMEI is a unique value including information for identifying the UE, such as a serial number, as shown in FIG. 1.

The IMSI is stored in a subscriber identity module, such as a USIM (universal subscriber identity module) card, and the UE is activated by putting the subscriber identity module to the UE.

A system for the existing 3G network checks the IMEI by a MSC (mobile switching center) transmitting the IMEI acquired from the UE to an equipment identify register (EIR: equipment identify register) (see Patent Literature 1, for example).

The IMEI check is intended to check for an IMEI of a radio terminal used in an unauthorized manner, such as an IMEI of a radio terminal stolen and used in an unauthorized manner with a legitimate IMSI, thereby preventing unauthorized use of the radio terminal.

Besides, the possibility of a femto cell that establishes a connection to a mobile communication core network via a wired line installed in a household or office is attracting increasing attention in recent years.

The femto cell is configured so that a femto cell base station (femto AP) that achieves a small coverage of several tents of meters in radius establishes a radio connection among UEs. Typically, the femto cell achieves an indoor coverage, such as a coverage in a household or office. Therefore, a necessary coverage can be achieved without an extra cost of infrastructure construction of the existing macro cell base station (see Patent Literature 2, for example).

CITATION LIST

Patent Literatures

[Patent Literature 1] JP2008-544608A
[Patent Literature 2] JP2009-504051A

SUMMARY OF INVENTION

Technical Problem

However, the system that disclosed in Patent Literature 1 and the existing 3G network described above do not consider a configuration for introducing a femto cell. Thus, a core network cannot recognize a signal from a femto cell base station, and therefore, prevention of unauthorized use of a radio terminal by an IMEI check in the same manner as in the existing public mobile communication network cannot be achieved.

In addition, the femto cell base station disclosed in Patent Literature 2 described above is not designed for use to prevent unauthorized use of a radio terminal by an IMEI check in the same manner as in the existing public mobile communication network.

The present invention has been devised in view of such circumstances, and an object of the present invention is to provide a femto cell base station, a gateway system, and a MAP gateway (GW) apparatus a communication system, a communication method, a communication apparatus and programs that can prevent unauthorized use of a radio terminal in the same manner as in the existing public mobile network therefor.

Solution to Problem

In order to attain the object, a femto cell base station according to the present invention is a femto cell base station used in a communication system having a function of checking a terminal ID thorough the use of an equipment identify register, comprising: generating means that generates a SIP (session initiation protocol) message including a terminal ID of a radio terminal and a check request for the terminal ID at a predetermined time; and first transmitting means that transmits the SIP message generated by said generating means to a higher level apparatus in said communication system.

A gateway system according to the present invention is a gateway system that forms a communication system having a function of checking a terminal ID thorough the use of an equipment identify register, comprising: first determining means that determines which apparatus is a destination based on whether a received SIP message includes information indicating a check request for a terminal ID or information indicating a SMS (short message service) when the gate way system receives the SIP message; and third transmitting means that transmits the content of the received SIP message to the destination determined by said first determining means.

A MAP (mobile application part) gateway apparatus according to the present invention is a MAP gateway apparatus used in a communication system having a function of checking a terminal ID thorough the use of an equipment identify register, comprising: second determining means that determines whether or not a received message includes information indicating a check request for a terminal ID; and fourth transmitting means that transmits a message corresponding to the received message including the check request to said equipment identification register in a case where said second determining means determines that the received message includes the information indicating the check request for said terminal ID.

A communication system according to the present invention is a communication system having a function of checking a terminal ID by an equipment identification register, comprising: a femto cell base station according to the present invention described above; a short message gateway apparatus according to the present invention described above; and a MAP gateway apparatus according to the present invention described above.

A communication control method according to the present invention is a communication control method in a communication system having a function of checking a terminal ID thorough the use of an equipment identify register, comprising: a generation step of a femto cell base station generating a SIP message including a terminal ID of a radio terminal and a check request for the terminal ID at a predetermined time; and a first transmission step of said femto cell base station transmitting the SIP message generated in said generation step to a higher level apparatus in said communication system.

Another communication control method according to the present invention is a communication control method in a communication system having a function of checking a terminal ID thorough the use of an equipment identify register, comprising: a first determination step of determining which apparatus is a destination based on whether a received SIP message includes information indicating a check request for a terminal ID or information indicating a SMS when a gateway system forming said communication system receives the SIP message; and a third transmission step of said gateway system transmitting the content of the received SIP message to the destination determined in said first determination step.

Another communication control method according to the present invention is a communication control method in a communication system having a function of checking a terminal ID thorough the use of an equipment identify register, comprising: a second determination step of a MAP gateway apparatus in said communication system determining whether or not a received message includes information indicating a check request for a terminal ID; and a fourth transmission step of said MAP gateway apparatus transmitting a message corresponding to the received message including the check request to said equipment identification register in a case where it is determined in said second determination step that the received message includes the information indicating the check request for said terminal ID.

A program for a femto cell base station according to the present invention is a program for a femto cell base station used in a communication system having a function of checking a terminal ID thorough the use of an equipment identify register, wherein the program makes a computer of said femto cell base station perform: a generation processing operation for generating a SIP message including a terminal ID of a radio terminal and a check request for the terminal ID at a predetermined time; and a first transmitting processing operation for transmitting the SIP message generated by said generation processing operation to a higher level apparatus in said communication system.

A program for a short message gateway apparatus according to the present invention is a program for a short message gateway apparatus used in a communication system having a function of checking a terminal ID thorough the use of an equipment identify register, wherein the program makes said short message gateway apparatus perform: a first determination processing operation for determining whether a received SIP message is to be transmitted to a core apparatus in a core network of said communication system or to be transmitted to an apparatus outside the core network when the short message gateway apparatus receives the SIP message; and a third transmission processing operation for transmitting the content of the SIP message determined to be transmitted to said core apparatus in said first determination processing operation to the core apparatus.

A program for a MAP gateway apparatus according to the present invention is a program for a MAP gateway apparatus used in a communication system having a function of checking a terminal ID thorough the use of an equipment identify register, wherein the program makes a computer of said MAP gateway apparatus perform: a second determination processing operation for determining whether or not a received message includes information indicating a check request for a terminal ID; and a fourth transmission processing operation for transmitting a message corresponding to the received message including the check request to said equipment identification register in a case where it is determined in said second determination processing operation that the received message includes information indicating the check request for said terminal ID.

Advantageous Effects of Invention

As described above, according to the present invention, a communication system using a femto cell base station can prevent unauthorized use of a radio terminal in the same manner as in the existing public mobile communication network.

BRIEF DESCRIPTION OF DRAWINGS

FIG. 3 is a diagram showing an example of parameters of a SIP message including "Check IMEI" information transmitted from femto AP 2.

FIG. 4 is a diagram showing related data for the SIP message used for transmitting and receiving information for an IMEI check.

FIG. 5 is a diagram showing patterns of position registration that triggers transmission of the "Check IMEI" information from femto AP 2.

FIG. 6 is a diagram showing operation patterns in a case where the "Check IMEI" information is transmitted.

FIG. 8 is a diagram showing an example of parameters of a "Check IMEI Response" message in Case #1 shown in FIG. 6.

FIG. 10 is a diagram showing an example of parameters of a "Check IMEI Response" message in Case #2 shown in FIG. 6.

DESCRIPTION OF EMBODIMENTS

Next, a femto cell base station, a gateway system, a MAP gateway (GW) apparatus, a communication system, a communication method, a communication apparatus and programs thereof according to an exemplary embodiment will be described in detail with reference to the drawings.

This exemplary embodiment is a preferred example of a communication system in which a femto cell base station (femto AP; femto access point) carries out call connection for UE, which is a radio terminal, and which prevents unauthorized use of a radio terminal by checking an IMEI in the same manner as an existing public mobile communication network within a range prescribed by a standard, such as 3GPP (the third generation partnership project).

Figure 1:
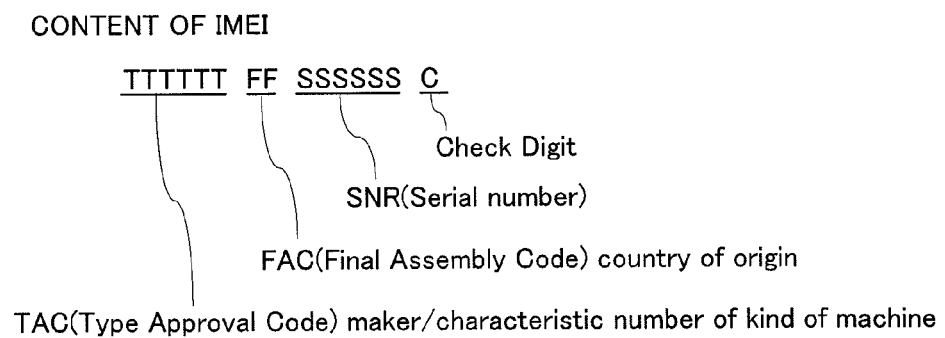
FIG. 1 is a diagram showing a configuration of an IMEI.
Figure 2:
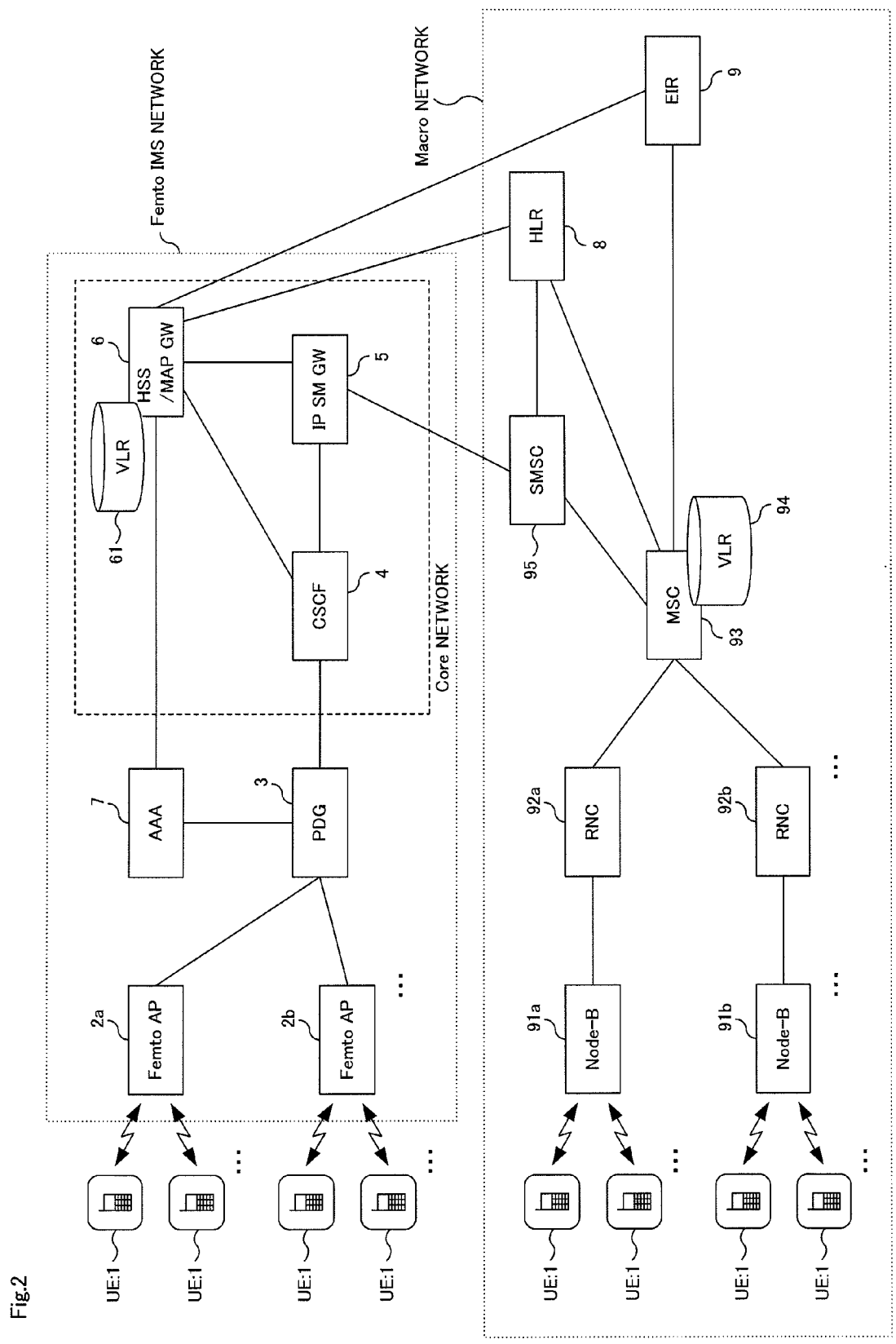
FIG. 2 is a block diagram showing an exemplary configuration of a communication system according to an exemplary embodiment.

As shown in FIG. 2, the communication system according to this exemplary embodiment comprises a macro network and a femto IMS (IP multimedia subsystem) network.

The macro network is a known existing 3G network. The macro network comprises UE (user equipment) 1, node-B 91, RNC (radio network controller) 92, MSC (mobile services switching centre) 93, VLR (visitor location register) 94, SMSC (short message service center) 95, HLR (home location register) 8, and EIR 9.

UE 1, node-B 91, RNC 92, MSC 93, VLR 94, SMSC 95, HLR 8 and EIR 9 forming the macro network are devices that perform processing operations in conformity with a standard, such as 3GPP, and thus specific descriptions of the processing operations will be omitted. Information on techniques used in the existing macro network is disclosed in 3GPP TS 33.234 V8.0.0 (December 2007), for example.

The femto IMS network comprises femto APs 2 that construct a predetermined coverage and PDG (packet data gateway) 3 that connects the femto APs 2 to each other via a network, and femto APs 2 and PDG 3 that are connected to a core network.

The core network comprises call state control server (CSCF; call session control function) 4, IP short message gateway apparatus (IPSMGW; IP short message gateway) 5, and HSS/MAPGW (home subscriber server/mobile application part gateway) (core device) 6.

Femto AP 2 is a small radio base station that achieves a small coverage of several tens of meters in radius.

PDG 3 is a device that relays a message.

CSCF 4 has a session control function using a SIP (session initiation protocol), a management function, an authentication function, a routing function and other functions.

IPSMGW 5 performs control of distribution of short message and performs determination and control of distribution of control information, such as supplementary service control.

HSS/MAPGW 6 has VLR (visitor location register) 61 and manages subscriber information on UE 1 connected to the femto IMS network. HSS/MAPGW 6 acquires subscriber information on UE 1 from HLR 8, stores the acquired subscriber information on UE 1 in VLR 61 and manages the subscriber information.

HSS/MAPGW 6 also has a MAPGW function (MAPGW device) that connects a line according to a protocol other than MAP, such as DIAMETER, to a line according to the MAP protocol and performs signal conversion between a signal according to the protocol other than MAP and a signal according to the MAP protocol. As described above, HSS/MAPGW 6 is an HSS that incorporates the MAPGW function.

AAA 7 is a device that performs authentication between UE 1 and the network.

EIR 9 previously stores an IMEI list of a radio terminal determined by an operator to be used in an unauthorized manner based on an operator input. In response to receiving a "Check IMEI" signal (a request for IMEI check), EIR 9 determines whether or not the received IMEI is included in the unauthorized IMEI list and transmits back the determination result.

Next, a schematic operation according to this exemplary embodiment will be described.

The communication system according to this exemplary embodiment comprises a plurality of femto APs 2, and UE 1 can move among the femto APs. Thus, femto AP 2 manages subscriber information (CS/PS) on UE 1 that resides in a coverage thereof. CS is an abbreviation of Circuit Switching, and PS is an abbreviation of Packet Switching.

Management of the subscriber information (CS/PS) on UE 1 by femto AP 2 is achieved by UE 1 performing CS position registration and PS position registration in turn with the core network via femto AP 2.

According to this exemplary embodiment, as the CS position registration, femto AP 2 transmits an IMEISV (IMEI software version number) of UE 1 included in a SIP request message in a MESSAGE method to IPSMGW 5 in response to completion of a transaction of registering the position information on UE 1 at VLR 61 or other components of the core network. Then, the IMEISV is transmitted to EIR 9 to check whether or not the IMEI is an unauthorized terminal.

The IMEISV includes the IMEI and a software version number of equipment, and the IMEI can be derived from the IMEISV.

The SIP message defines various methods that indicate the type of request. Femto AP 2 according to this exemplary embodiment generates an SIP message including the "Check IMEI" information used by EIR 9 to check the IMEI when the transaction of registering the position information (CS) on UE 1 at the core network is completed, and transmits the SIP message to IPSMGW 5 using the MESSAGE method. The value of a CPC (calling party's category) parameter described later is a notification.

Thus, the SIP message including the IMEISV can be transmitted to IPSMGW 5 via CSCF 4, and then IPSMGW 5 can relay the IMEISV to the core network.

Then, EIR 9 checks the IMEI. If it is determined that the IMEI of UE 1 is not the IMEI of an unauthorized terminal, position registration of UE 1 is performed, and UE 1 is enabled in the femto IMS network.

If it is determined that the IMEI of UE 1 is the IMEI of an unauthorized terminal, femto AP 2 transmits an SIP message "De-Register" to the core network to delete the position registration of UE 1, thereby disabling UE 1 in the femto IMS network.

Referring to FIG. 3, an example of parameters in a body section of the SIP message including the "Check IMEI" information transmitted by femto AP 2 to make EIR 9 check the IMEI will be described.

The parameters correspond to parameters prescribed as a known format based on the 3GPP standard for a signal from UE 1 as in the existing 3G network. That is, this drawing shows an exemplary configuration of a part of a transmission format from UE 1 excluding a User Data section.

In the example of parameters shown in FIG. 3, "Protocol Discriminator" as information that indicates a message for requesting an IMEI check is set at "e", which indicates "Check IMEI", and the Check IMEI message type is set at "0x01", which indicates a "Check IMEI request".

In addition, as a parameter, IMEISV information is stored in a region (not shown) in the body section of the SIP message. When EIR 9 checks the IMEI, the IMEI is derived from the IMEISV as described above.

FIG. 4 shows related data of a header section and the body section in the SIP message used by femto AP 2 to transmit and receive the information for a check IMEI to and from IPSMGW 5.

As shown in FIG. 4, in the SIP message in the MESSAGE method transmitted by femto AP 2 for a check IMEI, the R-URI (request-uniform resource identifier) that indicates the destination is the address of IPSMGW 5 as described above.

In addition, since the value of the CPC parameter in a PPI (p-preferred ID) header is "notification", the "Check IMEI" information can be passed to IPSMGW 5 through CSCF 4 without being regulated as described above.

After the SIP message for a check IMEI is transmitted from femto AP 2 to CSCF 4, CSCF 4 converts the PPI header into a PAI (p-asserted-identity) header including the same CPC parameter, and the resulting SIP message is transmitted to IPSMGW 5 from CSCF 4.

As described above, if the value of the CPC parameter is set "notification", the SIP message can be transmitted to the core network regardless of the presence or absence of a predetermined transmission regulation, such as ODB (operator determined barring). Therefore, the value of the CPC parameter can serve as non-regulated entity identifying information for CSCF 4.

Even if the value of the CPC parameter is set "priority", the SIP message can be transmitted to IPSMGW 5 through CSCF 4 regardless of the presence or absence of the transmission regulation. However, in this case, UE 1 is handled as a priority subscriber. As a result, there is a problem that some regulation is not successfully carried out even though a transmission regulation is preferably carried out. For example, although a transmission regulation to avoid congestion needs to be carried out, the transmission regulation is not carried out.

However, according to this exemplary embodiment, since the value of the CPC parameter is set "notification", the SIP message can pass through CSCF 4 without the regulation disadvantage. Therefore, the SIP message generated to include the "Check IMEI" information from UE 1 can be transmitted to IPSMGW 5 regardless of the presence or absence of a predetermined transmission regulation.

In addition the body section of the SIP message shown in FIG. 4 includes information following a TI (transaction ID) section in the information transmitted from UE 1, that is, the Message Type section and the User Data section following the Protocol Discriminator section. As described above, the User Data section stores the IMEISV.

If UE 1 transmits a message to use a SMS (short message service), femto AP 2 sets a value that indicates the SMS in Content-Type in the SIP header and transmits the resulting SIP message to IPSMGW 5.

When IPSMGW 5 receives the SIP message from femto AP 2, IPSMGW 5 determines whether the received SIP message indicates the SMS or indicates check IMEI and supplementary service (SS) control based on the value of Content-Type.

In the femto IMS network according to this exemplary embodiment, the distribution control during distribution of the check IMEI signal from IPSMGW 5 to HSS/MAPGW 6 is the same as in the case of an SS control signal, and therefore, a common value is used for Content-Type in check IMEI and SS control.

The value of Content-Type is not limited to the common value but may be a value dedicated for the check IMEI as long as the same distribution control can be achieved.

In the case where the received SIP message indicates the SMS, IPSMGW 5 designates SMSC 95 as the destination. In the case where the received SIP message indicates check IMEI and SS control, IPSMGW 5 designates HSS/MAPGW 6 as the destination.

Next, a pattern of position registration that triggers transmission of the "Check IMEI" information from femto AP 2 will be described with reference to FIG. 5.

In the femto IMS network according to this exemplary embodiment, when UE 1 moves from the macro network into a cell (coverage) of femto AP 2, when UE 1 moves between femto APs in the femto IMS network, when UE 1 is powered on/off and when UE 1 is replaced with a new one, femto AP 2 transmits the Check IMEI information.

In the existing 3G network (macro network), the "Check IMEI" information is not transmitted in the above-described cases where movement between BTS (base transceiver stations) that belong the MSC, which corresponds to the movement of UE 1 between femto APs in the femto IMS network, occurs and where power on/off in the MSC coverage, which corresponds to the power on/off of UE 1 in the femto IMS network, occurs.

This is because the existing 3G network is configured so that VLR 94 of MSC 93 manages each UE 1, and therefore, the check IMEI does not need to be performed when the IMEISV in VLR 94 is not changed.

However, the femto IMS network according to this exemplary embodiment is configured so that femto AP 2 manages the subscriber information (CS/PS) on UE 1 that resides in the coverage of femto AP 2. Therefore, the "Check IMEI" information is also transmitted in the above-described cases where UE 1 moves between femto APs in the femto IMS network and where UE 1 is powered on/off. This is because UE 1 that resides in the coverage of the femto AP can also be changed in these cases.

Next, referring to FIG. 6, each operation pattern in the case where the "Check IMEI" information is transmitted will be described.

Depending on the result of determination by EIR 9, the status of communication in the femto IMS network and the like, operation patterns shown in FIG. 6 can be considered as exemplary operations in the case where femto AP 2 transmits the "Check IMEI" information in the femto IMS network according to this exemplary embodiment.

In the following, each of the operation patterns Case #1 to Case #6 shown in FIG. 6 will be described with reference to sequence diagrams.

First, an exemplary operation in Case #1 shown in FIG. 6 where the IMEI of UE 1 is not an unauthorized one, and where femto AP 2 that transmits the "Check IMEI" information receives a check result message that indicates that the IMEI is not an unauthorized one as a normal response from EIR 9, will be described with reference to a sequence diagram shown in FIG. 7.

When UE 1 is to newly reside in a coverage of femto AP 2, for example, when UE 1 moves into the cell of femto AP 2, UE 1 starts CS service position registration (initial position registration). To this end, UE 1 first establishes a radio communication connection to femto AP 2 in step A1 and then transmits a Location Update Request to femto AP 2 in step A2.

When femto AP 2 receives the Location Update Request, femto AP 2 transmits an ID-Request for an IMSI to UE 1. In step A3, when UE 1 transmits an ID-Response including the IMSI to femto AP 2, the femto AP 2 transmits an ID-Request for the IMEISV. In step A4, UE 1 transmits an ID-Response including the IMEISV to femto AP 2.

When femto AP 2 receives the ID-Response, femto AP 2 establishes an IKE SA (interne key exchange-security authentication) with PDG 3 in step A5 and transmits an IKE-AUTH Request including an APN (access point name) and a NAI (network access identifier) to PDG 3. IKE-AUTH is an abbreviation of Internet Key Exchange-AUTHentication. The APN is information to determine a connection point in the network. The NAI is information to determine access to the network.

Since femto AP 2 has received the Location Update Request from UE 1, femto AP 2 determines that it is CS service position registration and transmits the NAI of "OCSO<UE#IMSI>/<Femto#IMSI>@realmname" to PDG 3. "OCSO" is information indicating that it is CS service position registration. "<UE#IMSI>" is information to determine UE and is IMSI.UE included in the ID-Request received from UE 1. "<Femto#IMSI>" is information to determine femto AP 2.

When PDG 3 receives the IKE-AUTH, PDG 3 transmits a Dia-EAP-Request to AAA 7. Dia-EAP is an abbreviation of Diameter-Extensible Authentication Protocol.

When AAA 7 receives the Dia-EAP-Request, AAA 7 determines that it is CS service position registration based on the NAI included in the Dia-EAP-Request. Thus, in step A7, AAA 7 transmits a Dia-Wx-MAR including the IMSI.UE to HSS/MAPGW 6. Dia-Wx-MAR is an abbreviation of Diameter-Wx-Multimedia Authentication Request.

When HSS/MAPGW 6 receives the Dia-Wx-MAR, HSS/MAPGW 6 transmits a MAP-SAI invocation [CS] to HLR 8 in step A8. MAP-SAI is an abbreviation of MAP-Send Authentication Information. [CS] means Circuit Switching. HSS/MAPGW 6 transmits the IMSI.UE included in the Dia-Wx-MAR by including the IMSI.UE in the MAP-SAI invocation [CS].

When HLR 8 receives the MAP-SAI invocation [CS], HLR 8 transmits a MAP-SAI Ack to HSS/MAPGW 6 in step A9. HLR 8 acquires a RAND/AUTH/CK/IK/XRES corresponding to the IMSI.UE included in the MAP-SAI invocation [CS] and transmits the acquired RAND/AUTH/CK/IK/XRES by including the RAND/AUTH/CK/IK/XRES in the MAP-SAT Ack.

The RAND/AUTH/CK/IK/XRES is information in conformity with the 3GPP. RAND is an abbreviation of Random challenge, AUTH is an abbreviation of Authentication Token, CK is an abbreviation of Cipher Key, IK is an abbreviation of Integrity Key, and XRES is an abbreviation of Expected RESponse.

In this exemplary operation, HLR 8 transmits the RAND/AUTH/CK/IK/XRES by including the RAND/AUTH/CK/IK/XRES in the MAP-SAI Ack (EAP-AKA authentication). Alternatively, however, a RAND/AUTH/KC/RES may be included in the MAP-SAI Ack and transmitted (EAP-SIM authentication). HLR 8 can select the EAP-AKA authentication (UMTS authentication) or the EAP-SIM authentication (GSM authentication) depending on the capability of an NW that the subscriber of UE 1 participates.

When HSS/MAPGW 8 receives the MAP-SAI Ack, HSS/MAPGW 6 transmits a Dia-Wx-MAA to AAA 7 in step A10. Dia-Wx-MAA is an abbreviation of Diameter-Wx-Multimedia Authentication Answer. HSS/MAPGW 6 transmits the RAND/AUTH/CK/IK/XRES included in the MAP-SAI Ack by including the RAND/AUTH/CK/IK/XRES in the Dia-Wx-MAA.

When AAA 7 receives the Dia-Wx-MAA, AAA 7 transmits a Dia-EAP-Answer to PDG 3. AAA 7 transmits the RAND/AUTH/CK/IK included in the Dia-Wx-MAA by including the RAND/AUTH/CK/IK in the Dia-EAP-Answer.

When PDG 3 receives the Dia-EAP-Answer, PDG 3 transmits an IKE-AUTH Response to femto AP 2 in step A11. PDG 3 transmits an EAP-Request/AKA-Challenge and the RAND/AUTH/CK/IK included in the Dia-EAP-Answer by including the EAP-Request/AKA-Challenge and the RAND/AUTH/CK/IK in the IKE-AUTH Response. AKA is an abbreviation of Authentication and Key Agreement.

When femto AP 2 receives the IKE-AUTH Response, femto AP 2 transmits an Authentication Request to UE 1 in step S12. Femto AP 2 transmits the RAND/AUTH included in the IKE-AUTH Response by including the RAND/AUTH in the Authentication Request.

When UE 1 receives the Authentication Request, UE 1 performs an authentication calculation based on the RAND/AUTH included in the Authentication Request. The authentication calculation is performed in conformity with the 3GPP.

UE 1 calculates the RES and transmits the calculated RES by including the RES in the Authentication Response in step A13. The RES is calculated in conformity with the 3GPP.

When femto AP 2 receives the Authentication Response, femto AP 2 transmits the IKE-AUTH Request to PDG 3. Femto AP 2 transmits an EAP-Response/AKA-Challenge and the RES included in the Authentication Response by including the EAP-Response/AKA-Challenge and the RES in the IKE-AUTH Request.

When PDG 3 receives the IKE-AUTH Request, PDG 3 transmits the Dia-EAP-Request to AAA 7 in step A14. PDG 3 calculates a MAC (Message Authentication Code) and transmits the RES and the MAC by including the RES and the MAC in the Dia-EAP-Request. The MAC is calculated in conformity with the 3GPP.

When AAA 7 receives the Dia-EAP-Request, AAA 7 performs UE authentication. The UE authentication is performed in conformity with the 3GPP. When the UE authentication succeeds, AAA 7 transmits the Dia-EAP-Answer to PDG 3. AAA 7 transmits an EAP-Success by including the EAP-Success in the Dia-EAP-Answer.

When PDG 3 receives the Dia-EAP-Answer, PDG 3 transmits the IKE-AUTH Response to femto AP 2 in step A15. PDG 3 transmits the EAP-Success by including the EAP-Success in the IKE-AUTH Response.

Once the authentication transaction from step A5 to A15 is completed, femto AP 2 and UE 1 communicate with each other in a secret manner in a method in conformity with the 3GPP using a Security Mode Command.

In step A17, femto AP 2 transmits an SIP-Register whose Message Type is "Register" to CSCF 4. Femto AP 2 transmits the IMSI.UE to CSCF 4 by including the IMSI.UE in the SIP-Register.

When CSCF 4 receives the SIP-Register, CSCF 4 determines that CSCF 4 has received the SIP-Register that is a Call ID in the subscriber information on new UE 1 (Register information on femto AP 2). In this case, in step A18, CSCF 4 determines that new position registration of UE 1 occurs because of movement of UE 1 from the macro network into the femto AP or power on of UE 1 and transmits a Dia-Cx-SAR to HSS/MAPGW 6. SAR is an abbreviation of Server-Assignment-Request. CSCF 4 transmits the IMSI.UE by including the IMSI.UE in the Dia-Cx-SAR.

When HSS/MAPGW 6 receives the Dia-Cx-SAR, HSS/MAPGW 6 transmits a MAP-Update Location invocation

[CS] to HLR 8 in step A19. HSS/MAPGW 6 transmits the IMSI.UE by including the IMSI.UE in the MAP-Update Location invocation.

When HLR 8 receives the MAP-Update Location invocation, HLR 8 registers the subscriber information on UE 1 in a manner that conforms with the 3GPP in step A29, and transmits a MAP-Insert Subscriber Data invocation to HSS/MAPGW 5 in step A20. HLR 8 transmits the subscriber information by including the subscriber information in the MAP-Insert Subscriber Data invocation.

When HSS/MAPGW 6 receives the MAP-Insert Subscriber Data invocation, HSS/MAPGW 6 creates subscriber information on UE 1 based on the subscriber information included in the MAP-Insert Subscriber Data invocation. HSS/MAPGW 6 registers the subscriber information on UE 1 at VLR 61 and manages the subscriber information (CS) on UE 1 in VLR 61. In this case, in step A30, HSS/MAPGW 6 manages the subscriber information (CS) on UE 1 in association with information on femto AP 2 in VLR 61.

Then, in step A21, HSS/MAPGW 6 transmits a MAP-Insert Subscriber Data Ack to HLR 8.

When HLR 8 receives the MAP-Insert Subscriber Data Ack, HLR 8 transmits a MAP-Update Location Ack to HSS/MAPGW 6 in step A22.

When HSS/MAPGW 6 receives the MAP-Update Location Ack, HSS/MAPGW 6 transmits the Dia-Cx-SAA to CSCF 4 in step A23. SAA is an abbreviation of Server-Assignment-Answer. HSS/MAPGW 6 transmits a MSISDN by including the MSISDN in the Dia-Cx-SAA.

When CSCF 4 receives the Dia-Cx-SAA, CSCF 4 transmits a SIP-200 OK including the MSISDN to femto AP 2 in step A24. In addition, CSCF 4 manages the information on the SIP-Register received from femto AP 2 in association with the subscriber information (CS) on UE 1. Thus, in step A31, CSCF 4 manages the subscriber information (CS) on UE 1 in association with femto AP 2.

In steps A25 to A28, for PS in GPRS (General Packet Radio Services), HSS/MAPGW 6 performs the same signal transmissions and receptions as the signal transmissions and receptions in steps A19 to A22.

Once the transaction of registering the position information (CS) on UE 1 at the core network from step A17 to A24 is completed, femto AP 2 creates a SIP message for the check IMEI including the IMEISV and transmits the SIP message to IPSMGW 5 using the MESSAGE method in step A32.

Parameters of the SIP message for IMEI check transmitted in step A32 are those shown in FIG. 3 described above, for example.

When IPSMGW 5 receives the "Check IMEI" information via the SIP message in the MESSAGE method from femto AP 2, IPSMGW 5 determines that the destination of the received content transmitted as a message is not SMSC 95, which is the destination in the case of a short message, but HSS/MAPGW 6, based on the fact that the value of the Content-Type is "application/vnd.3gpp.adtap", which indicates IMEI check and SS control. Therefore, IPSMGW 5 maps the received content to a message according to a predetermined IP-based protocol, such as DIAMETER, and transmits the resulting message according to the protocol to HSS/MAPGW 6 in step A33.

In step A34, IPSMGW 5 transmits a "202 Accept" SIP message to femto AP 2.

When HSS/MAPGW 6 receives the "Check IMEI" information from IPSMGW 5, the MAPGW function of HSS/MAPGW 6 determines that the destination of the message is EIR 9 based on the fact that Protocol Discriminator of the received message indicates Check IMEI. Then, in step A35, HSS/MAPGW 6 transmits the received message content, that is, a message "Check IMEI-inv" that is a message in a method corresponding to the "Check IMEI" and the received IMEISV included in the message, to EIR 9.

When EIR 9 receives the "Check IMEI" information including the IMEISV, EIR 9 checks the IMEI derived from the IMEISV against the unauthorized IMEI list stored in the device. If the IMEI derived from the received "Check IMEI" information is not included in the unauthorized IMEI list, EIR 9 transmits a message "Check IMEI-ack" that indicates "White Listed" to HSS/MAPGW 6 in step A36.

If EIR 9 has an IMEI list that shows a Gray List, and the IMEI derived from the received "Check IMEI" information is included in the IMEI list showing the Gray List, EIR 9 transmits a message "Check IMEI-ack" that indicates "Gray Listed" to HSS/MAPGW 6.

When HSS/MAPGW 6 receives the message "Check IMEI-ack" from EIR 9, the MAPGW function of HSS/MAPGW 6 maps the received content to a message according to a protocol such as DIAMETER, and HSS/MAPGW 6 transmits the resulting message according to the protocol to IPSMGW 5 in step A37.

When IPSMGW 5 receives a message "Dia-Check IMEI-ack" from HSS/MAPGW 6, IPSMGW 5 maps the received content into the SIP message as shown in FIG. 8 showing an example of parameters. In the example shown in FIG. 8, Protocol Discriminator is mapped to "e" that indicates Check IMEI, and the Check IMEI Message Type indicating the check result from EIR 9 is mapped to "0x02" that indicates "White Listed" or "Gray Listed".

IPSMGW 5 transmits the resulting "Check IMEI Response" message in the MESSAGE method to femto AP 2 in step A38.

When femto AP 2 receives the "Check IMEI Response" message in the MESSAGE method from IPSMGW 5, femto AP 2 transmits a "200 OK" SIP message to IPSMGW 5 in step A39.

Then, in step A40, femto AP 2 captures TMSI (temporary mobile subscriber identities) in a method in conformity with the 3GPP and transmits the captured TMSI to UE 1 in a secret manner using the Security Mode Command by including the TMSI in a message "Location Update Accept".

When UE 1 receives the message "Location Update Accept", UE 1 acquires the TMSI generated by femto AP 2 and transmits a message "TMSI Reallocation Complete" to femto AP 2.

Once femto AP 2 receives the message "TMSI Reallocation Complete", femto AP 2 manages the TMSI in association with the IMSI.UE of UE 1. Thus, in step A42, FAP#2 manages the subscriber information (CS) on UE 1.

After that, when PS position registration or the like occurs, femto AP 2 disconnects the line to UE 1 in step A41.

As described above, in the case where the IMEI of UE 1 is not included in the unauthorized IMEI list of EIR 9, position information registration of UE 1 is normally performed, and UE 1 is normally enabled in the femto IMS network.

Figure 9:
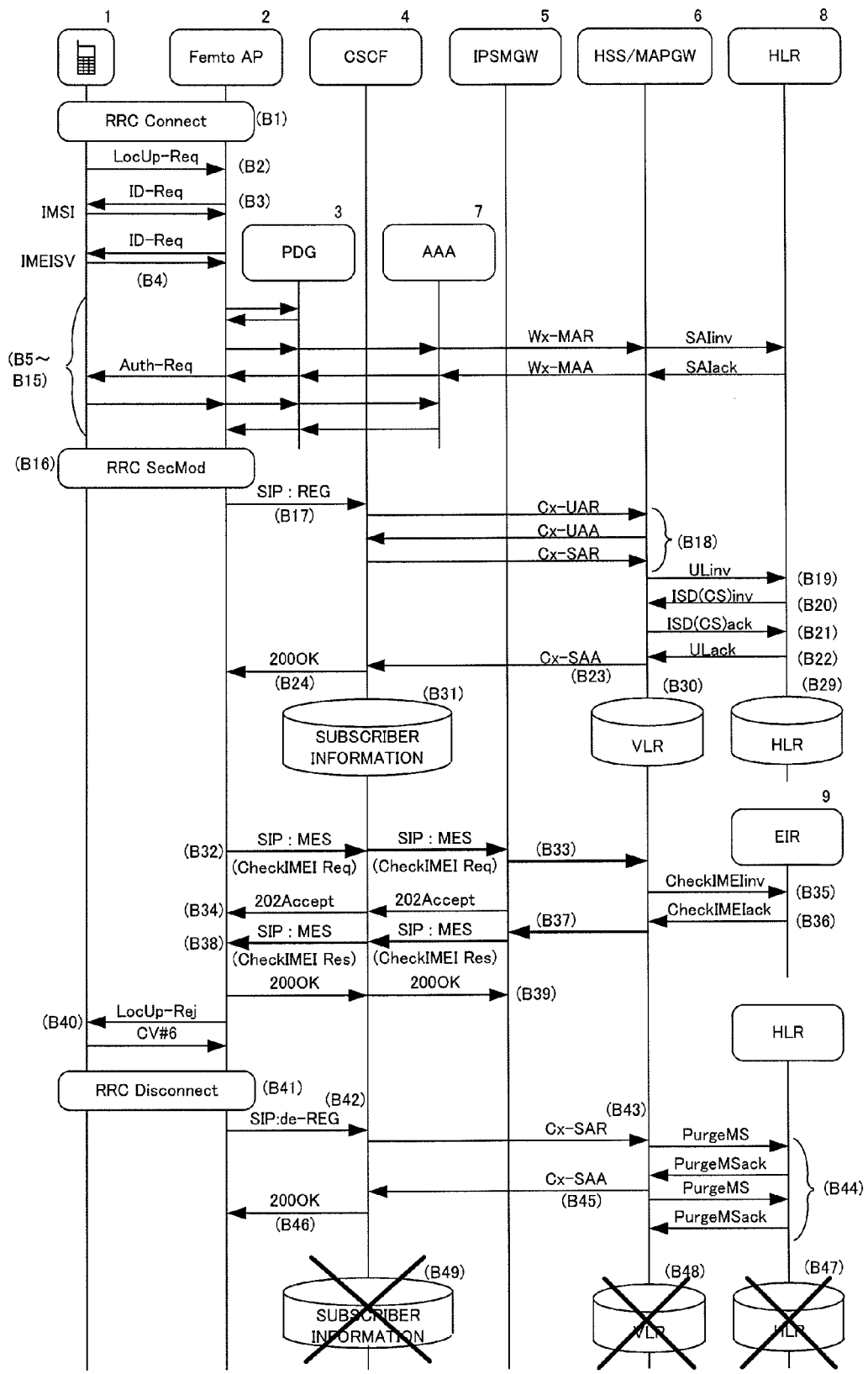
FIG. 9 is a sequence diagram showing an exemplary operation in Case #2 shown in FIG. 6.

Next, an exemplary operation in Case #2 shown in FIG. 6 where the IMEI of UE 1 is included in the unauthorized IMEI list of EIR 9, and where femto AP 2 that transmits the "Check IMEI" information receives a check result that indicates that the IMEI is an unauthorized one as a normal response from EIR 9, will be described with reference to a sequence diagram shown in FIG. 9.

Figure 7:
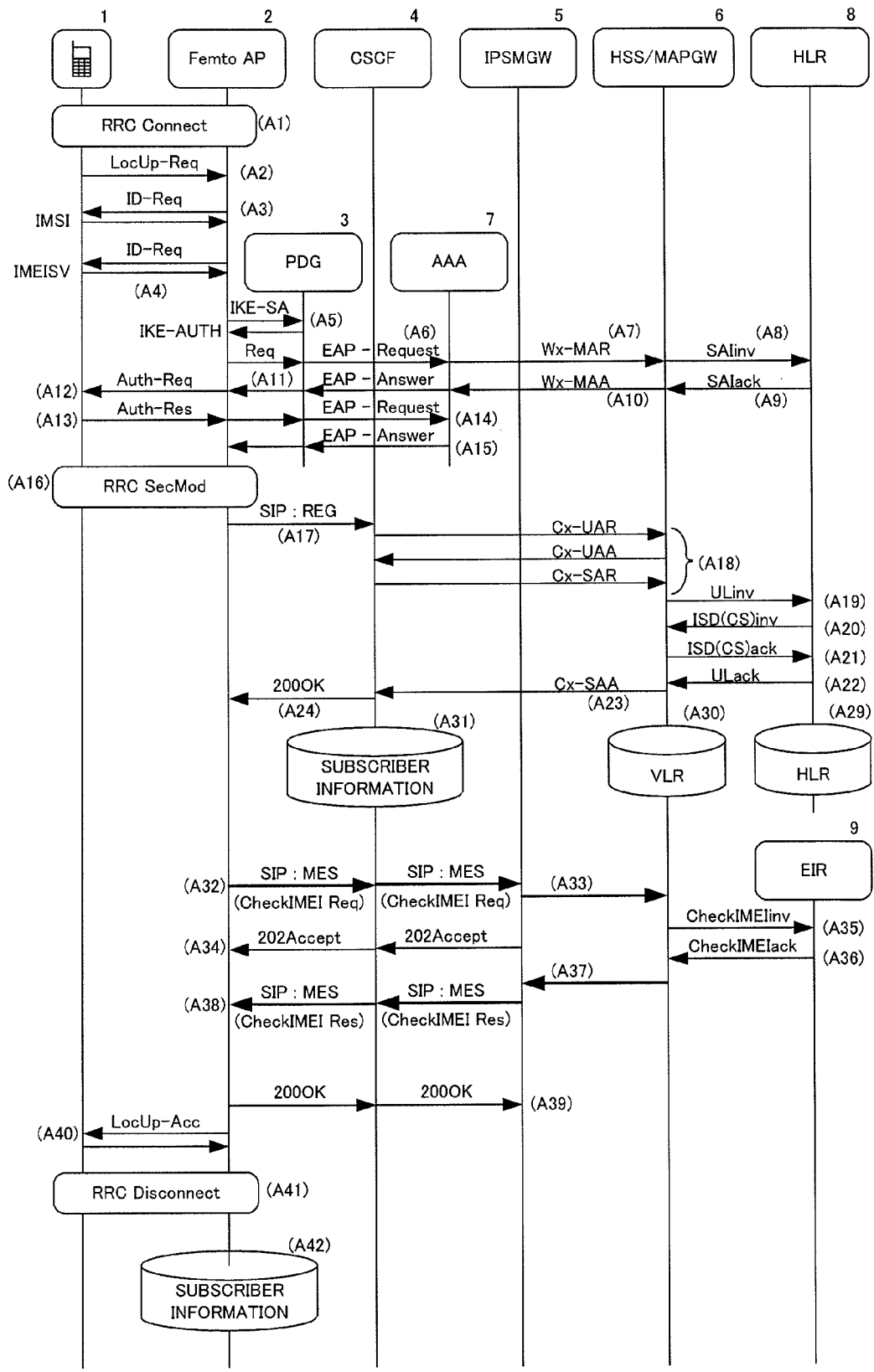
FIG. 7 is a sequence diagram showing an exemplary operation in Case #1 shown in FIG. 6.

Steps B1 to B35 are the same as Steps A1 to A35 in Case #1 shown in FIG. 6 and described above with reference to the sequence diagram of FIG. 7.

When EIR 9 receives the "Check IMEI" information including the IMEISV in step B35, EIR 9 checks the IMEI derived from the IMEISV against the unauthorized IMEI list stored in the device. If the IMEI derived from the received "Check IMEI" information is included in the unauthorized IMEI list, EIR 9 transmits a message "Check IMEI-ack" that indicates "Black Listed" to HSS/MAPGW 6 in step B36.

When HSS/MAPGW 6 receives the message "Check IMEI-ack" from EIR 9, the MAPGW function of HSS/MAPGW 6 maps the received content to a message according to a protocol, such as DIAMETER, and HSS/MAPGW 5 transmits the resulting message according to the protocol to IPSMGW 5 in step B37.

When IPSMGW 5 receives a message "Dia-Check IMEI-ack" from HSS/MAPGW 6, IPSMGW 5 maps the received content into the SIP message as shown in FIG. 10 showing an example of parameters. In the example shown in FIG. 10, "Protocol Discriminator" is mapped to "e" that indicates "Check IMEI", and "Check IMEI Message Type" indicating the check result from EIR 9 is mapped to "0x03" that indicates "Black Listed".

IPSMGW 5 transmits the resulting "Check IMEI Response" message in the MESSAGE method to femto AP 2 in step B38.

When femto AP 2 receives the "Check IMEI Response" message in the MESSAGE method from IPSMGW 5, femto AP 2 transmits a "200 OK" SIP message to IPSMGW 5 in step B39.

Then, in step B40, femto AP 2 transmits a message "Location Update Reject" including a message "CV#6: Illegal ME" to UE 1, since the check result for the received "Check IMEI Response" message in the MESSAGE method indicates "Black Listed". CV is an abbreviation of Cause Value, which indicates an error cause.

In step B41, femto AP 2 disconnects the line to UE 1, and then, in step B42, femto AP 2 transmits a message "SIP-De-Register" whose Message Type is De-Register to CSCF 4. Femto AP 2 transmits the IMSI.UE to CSCF 4 by including the IMSI.UE in the message "SIP-De-Register".

When CSCF 4 receives the message "SIP-De-Register", CSCF 4 determines that CSCF 4 has received a request to delete the registered subscriber information on UE 1 (Register information on femto AP 2) and transmits a "Dia-Cx-SAR" message including the information on the deletion of the position information to HSS/MAPGW 6 in step B43.

When HSS/MAPGW 6 receives the "Dia-Cx-SAR" message including the information on the deletion of the position information, HSS/MAPGW 6 transmits a "Purge MS" message to HLR 8. When HLR 8 receives the "Purge MS" message, HLR 8 deletes the position registration information on corresponding UE 1 in step B47 and transmits a "Purge MS-ack" message to HSS/MAPGW 6. When HSS/MAPGW 6 receives the "Purge MS-ack" message, HSS/MAPGW 6 deletes the position registration information on UE 1 from VLR 61 in step B48.

In addition, in step B44, HSS/MAPGW 6 performs the same "Purge MS" transmission to and reception from HLR 9 for PS.

In step B45, HSS/MAPGW 6 transmits a "Dia-Cx-SAA" message including the information on the deletion of the position information to CSCF 4.

When CSCF 4 receives the "Dia-Cx-SAA" message including the information on the deletion of the position information, CSCF 4 deletes the subscriber information on UE 1 in step B49 and transmits a "SIP-200 OK" message to femto AP 2 in step B46.

As described above, in the case where the IMEI of UE 1 is included in the unauthorized IMEI list of EIR 9, femto AP 2 does not manage the subscriber information on UE 1 but deletes the subscriber information from CSCF 4, VLR 61 and HLR 8 in response to the "SIP-De-Register" message. Therefore, UE 1 is disabled in the femto IMS network.

Figure 11:
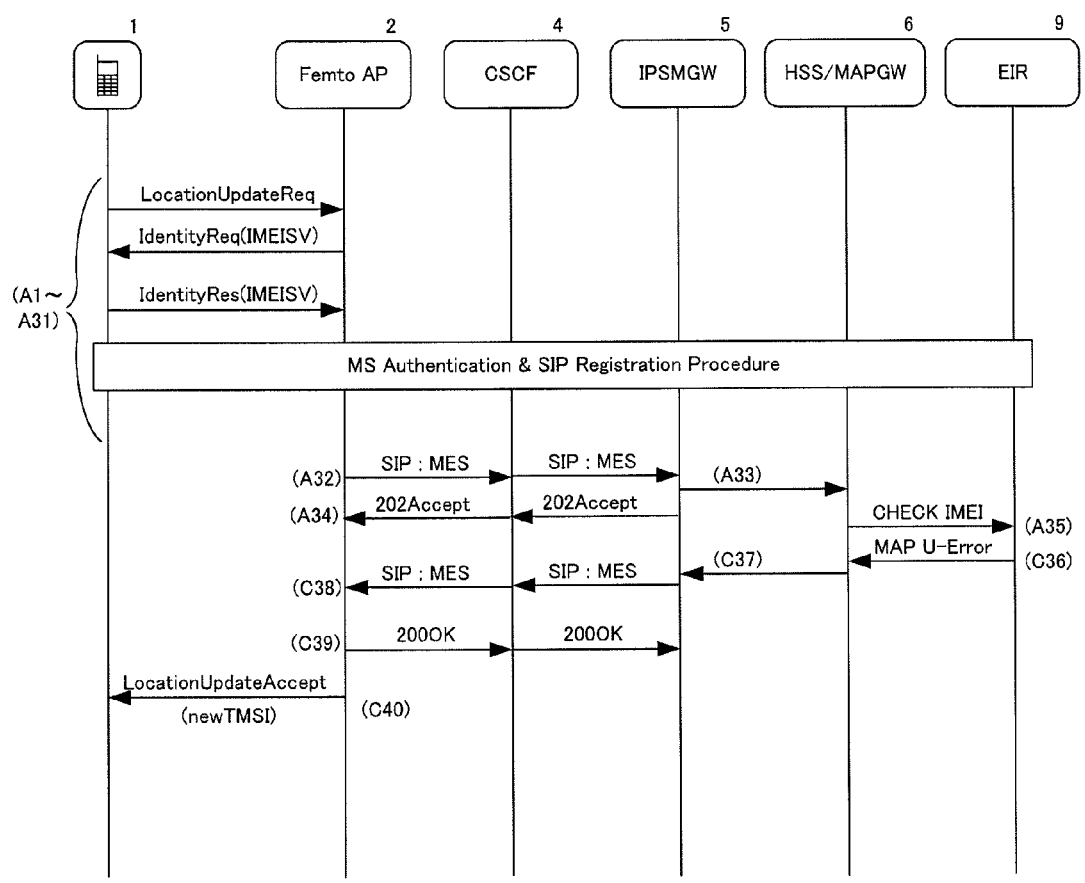
FIG. 11 is a sequence diagram showing an exemplary operation in Case #3 shown in FIG. 6.

Next, an exemplary operation in Case #3 shown in FIG. 6 where femto AP 2 that transmits the "Check IMEI" information receives a message indicating an error from EIR 9 will be described with reference to a sequence diagram shown in FIG. 11.

First, the same operations as in steps A1 to A35 shown in FIG. 7 described above are performed, and HSS/MAPGW 6 transmits a "Check IMEI-inv" message to EIR 9.

EIR 9 detects some error as a result of IMEI check and transmits a "MAP U-Error" message indicating unknown equipment or a "MAP U-Error" message indicating System Failure to HSS/MAPGW 6 in step C36.

When HSS/MAPGW 6 receives the "MAP U-Error" message from EIR 9, the MAPGW function of HSS/MAPGW 6 maps the received content to a message according to a protocol, such as DIAMETER, and HSS/MAPGW 6 transmits the resulting message according to the protocol to IPSMGW 5 in step C37.

When IPSMGW 5 receives a "Dia-U-Error" message from HSS/MAPGW 6, IPSMGW 5 maps the received content into the SIP message in the MESSAGE method in which a parameter indicating "Check IMEI Accept (White/Gray)" is set in the same manner as in the example shown in FIG. 8 described above, whether the MAP Error indicates unknown equipment or System Failure.

In step C38, IPSMGW 5 transmits the resulting SIP message in the MESSAGE method to femto AP 2.

When femto AP 2 receives the SIP message in the MESSAGE method from IPSMGW 5, femto AP 2 transmits a "200 OK" SIP message to IPSMGW 5 in step C39.

Then, in step C40, femto AP 2 captures TMSI in a method in conformity with the 3GPP and transmits the captured TMSI to UE 1 in a secret manner using the Security Mode Command by including the TMSI in a message "Location Update Accept", since the information included in the received SIP message in the MESSAGE method is not a check result that indicates "Black Listed".

As described above, in the case where femto AP 2 that transmits the "Check IMEI" information receives a message that indicates an error from EIR 9, position information registration for UE 1 is normally performed as a quasi-normal operation, and UE 1 is normally enabled in the femto IMS network.

Figure 12:
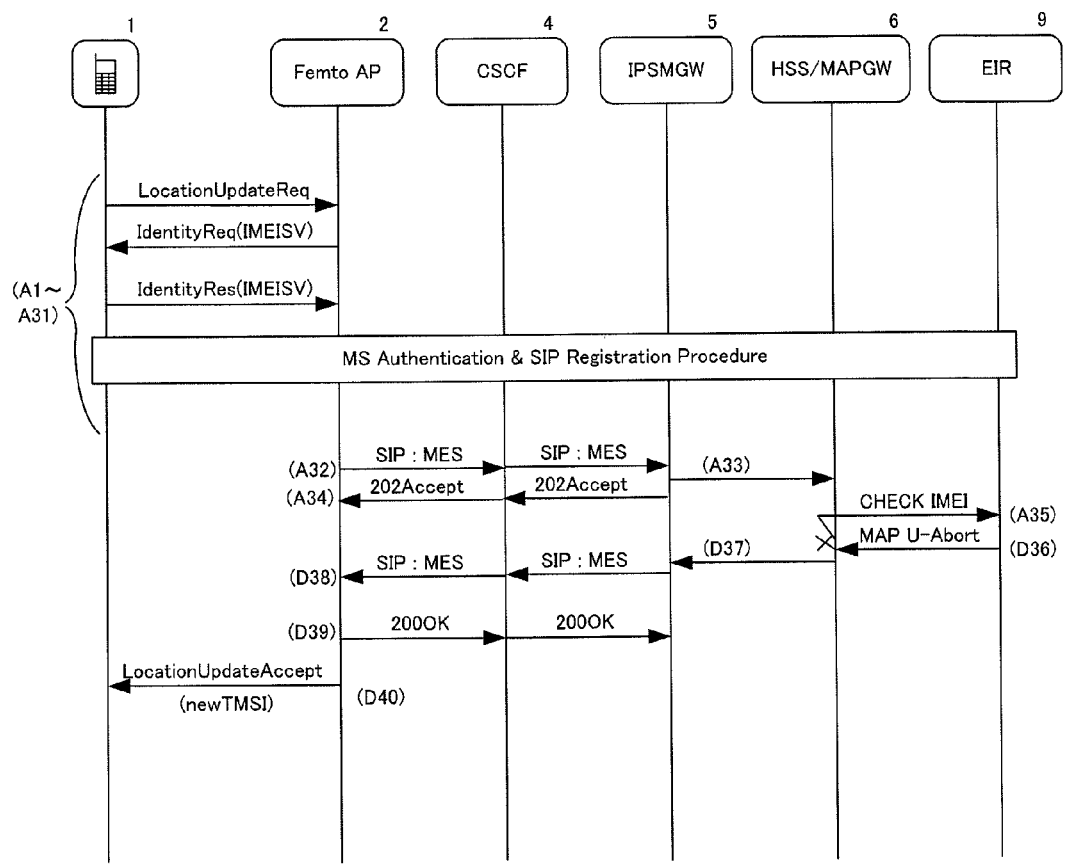
FIG. 12 is a sequence diagram showing an exemplary operation in Case #4 shown in FIG. 6.

Next, an exemplary operation in Case #4 shown in FIG. 6 where, even though the "Check IMEI" information is transmitted to EIR 9, no response signal is transmitted to HSS/MAPGW 6, and a timeout occurs, will be described with reference to a sequence diagram shown in FIG. 12.

First, the same operations as in steps A1 to A35 shown in FIG. 7 described above are performed, and HSS/MAPGW 6 transmits a "Check IMEI-inv" message to EIR 9. When the transmission occurs, a timer of HSS/MAPGW 6 starts counting.

If no response signal from EIR 9 is received, and the waiting time set in the timer of HSS/MAPGW 6 expires because of the occurrence of some error or the like, the MAPGW function of HSS/MAPGW 6 maps an indication of the timeout of the response waiting time into a message according to a protocol, such as DIAMETER, and transmits the message to IPSMGW 5 in step D37.

When IPSMGW 5 receives the indication of the timeout of the response waiting time from HSS/MAPGW 6, IPSMGW 5 maps the received content into the SIP message in the MESSAGE method in which a parameter indicating "Check IMEI Accept (White/Gray)" is set in the same manner as in the example shown in FIG. 8 described above.

In step D38, IPSMGW 5 transmits the resulting SIP message in the MESSAGE method to femto AP 2.

When femto AP 2 receives the SIP message in the MESSAGE method from IPSMGW 5, femto AP 2 transmits a "200 OK" SIP message to IPSMGW 5 in step D39.

Then, in step D40, femto AP 2 captures TMSI in a method in conformity with the 3GPP and transmits the captured TMSI to UE 1 in a secret manner using the Security Mode Command by including the TMSI in a message "Location Update Accept", since the information included in the received SIP message in the MESSAGE method is not a check result that indicates "Black Listed".

As described above, even in the case where femto AP 2 transmits the "Check IMEI" information, but timeout of the response signal waiting time occurs, position information registration for UE 1 is normally performed as a quasi-normal operation, and UE 1 is normally enabled in the femto IMS network.

Figure 13:
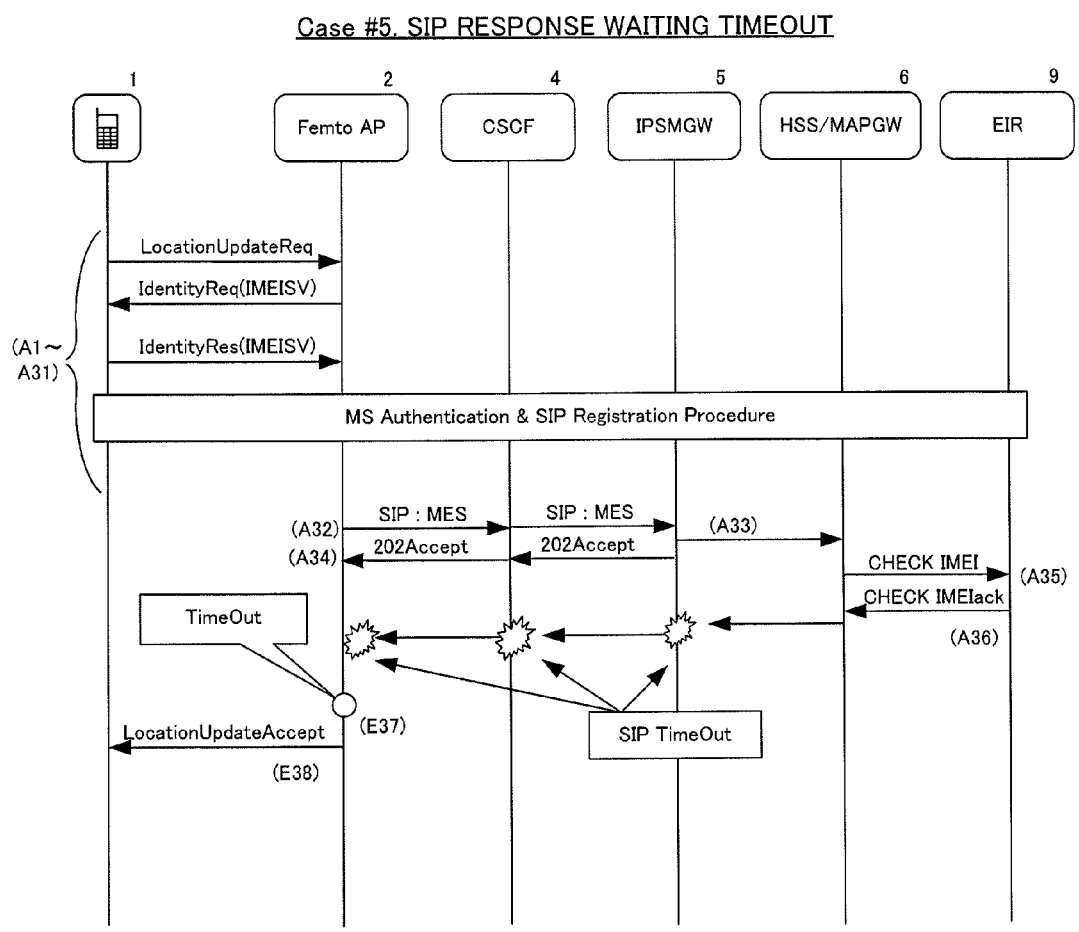
FIG. 13 is a sequence diagram showing an exemplary operation in Case #5 shown in FIG. 6.

Next, an exemplary operation in Case #5 shown in FIG. 6 where, even though femto AP 2 transmits the "Check IMEI" information, no response signal is transmitted to femto AP 2, and a timeout occurs will be described with reference to a sequence diagram shown in FIG. 13.

First, the same operations as in steps A1 to A32 shown in FIG. 7 described above are performed, and femto AP 2 transmits a "Check IMEI" SIP message in the MESSAGE method to IPSMGW 5 in step A32. When the transmission occurs, a timer of femto AP 2 starts counting.

Even if the operations in steps A33 to A36 shown in FIG. 7 described above are performed, a SIP timeout can occur in IPSMGW 5 or CSCF 4 because of the occurrence of some error. If no response signal from IPSMGW 5 is received, and the waiting time of the timer of femto AP 2 expires in step E37, femto AP 2 captures TMSI in a method in conformity with the 3GPP and transmits the captured TMSI to UE 1 in a secret manner using the Security Mode Command by including the TMSI in a message "Location Update Accept" in step E38, since femto AP 2 has not received a check result that indicates "Black Listed".

As described above, even in the case where femto AP 2 transmits the "Check IMEI" information, but a SIP timeout of the response signal waiting time occurs, position information registration for UE 1 is normally performed as a quasi-normal operation, and UE 1 is normally enabled in the femto IMS network.

Figure 14:
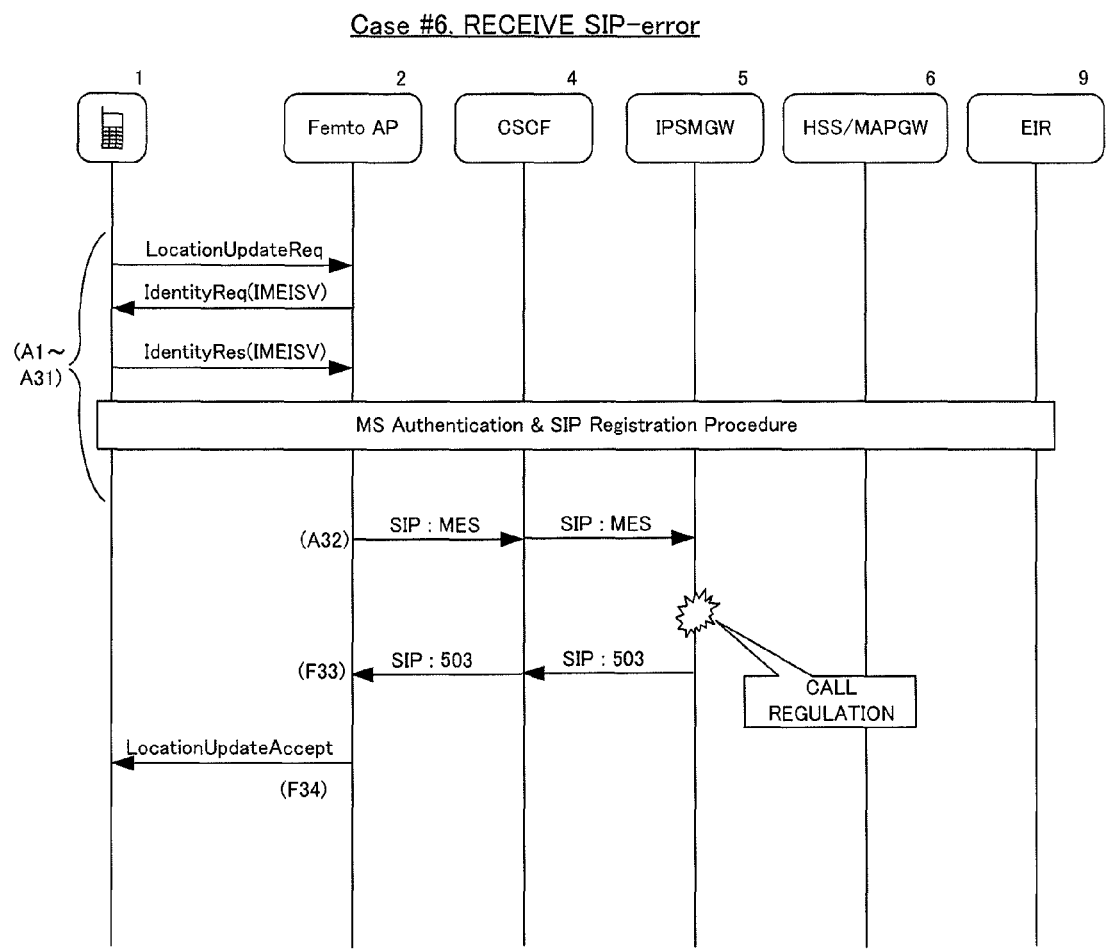
FIG. 14 is a sequence diagram showing an exemplary operation in Case #6 shown in FIG. 6.

Next, an exemplary operation in Case #6 shown in FIG. 6 where femto AP 2 receives an error message indicating an error caused by a problem with a server will be described with reference to a sequence diagram shown in FIG. 14. Specifically, an example in which traffic congestion occurs in IPSMGW 5, and a call regulation is carried out will be described below.

First, the same operations as in steps A1 to A32 shown in FIG. 7 described above are performed, and femto AP 2 transmits a "Check IMEI" SIP message in the MESSAGE method to IPSMGW 5 in step A32.

Since congestion occurs in message processing, and a call regulation is carried out, IPSMGW 5 returns a "SIP-503 Service Unavailable" message in response to the SIP message from femto AP 2 in step F33.

When femto PA 2 receives the "SIP-503 Service Unavailable" message, femto AP 2 captures TMSI in a method in conformity with the 3GPP and transmits the captured TMSI to UE 1 in a secret manner using the Security Mode Command by including the TMSI in a message "Location Update Accept" in step F34, since femto AP 2 has not received a check result that indicates "Black Listed".

As described above, even in the case where congestion occurs, and a call regulation is carried out after femto AP 2 transmits the "Check IMEI" information, position information registration for UE 1 is normally performed as a quasi-normal operation, and UE 1 is normally enabled in the femto IMS network.

As described above, according to this exemplary embodiment, even when UE 1 resides in the coverage of femto AP 2, the core network can recognize the "Check IMEI" information from femto AP 2. Therefore, an unauthorized IMEI can be checked for to prevent unauthorized use of a radio terminal in the same manner as in the case where UE 1 resides in the coverage of Node-B 91 in the macro network.

As described above, according to this exemplary embodiment, in the femto IMS network including femto AP 2, an unauthorized IMEI can be checked in the same manner as in the existing 3G network, and unauthorized use of a radio terminal can be prevented.

In addition, according to this exemplary embodiment, in the SIP message including the "Check IMEI" information from femto AP 2, the value of the CPC parameter is set to be "notification". Therefore, even if a transmission regulation due to ODB is carried out, the "Check IMEI" information can be transmitted from femto AP 2 to IPSMGW 5 through CSCF 4 without causing a failure.

In addition, according to this exemplary embodiment, the MESSAGE method is used for the SIP message including the "Check IMEI" information from femto AP 2, and the value of the "Content-Type" in the SIP header indicates Check IMEI or SS control. Therefore, the SIP message including the "Check IMEI" information can be recognized by IPSMGW 5 and can be smoothly distributed to EIR 9.

The exemplary embodiment described above is a preferred embodiment, and the present invention is not limited to the exemplary embodiment, and various modifications can be made to the exemplary embodiment based on the technical concepts of the present invention.

For example, although EIR 9 derived the IMEI from the IMEISV in order to perform a check IMEI in the exemplary embodiment described above, the present invention is not limited to this configuration as long as the IMEI can be transmitted to EIR 9, and another device may be used to derive the IMEI.

Furthermore, the pattern of position registration that triggers transmission of the "Check IMEI" information from femto AP 2 is not limited to the pattern shown in FIG. 5. For example, a check IMEI may be performed in the case where UE residing in the coverage of the femto IMS network performs periodic position registration (every 6 minutes, for example) or a femto AP residing in the femto IMS network performs periodic position registration (every 50 minutes, for example) using a message "SIP-Re-Register".

In the exemplary embodiment described above, femto AP 2 transmits the "Check IMEI" information in response to completion of the transaction of registering the position information on UE 1 at the core network. However, the timing of transmission of the "Check IMEI" information is not limited to this timing as long as the "Check IMEI" information can be transmitted to EIR 9 at a predetermined timing during position registration, such as after the line connection for position registration is established. The timing of transmission of the "Check IMEI" information may be any predetermined timing, such as before the position registration transaction is started.

In the exemplary embodiment described above, the value of "Content-Type" in the SIP header is Check IMEI or SS control, and therefore, IPSMGW 5 uses the value for determination purposes as information that indicates "Check IMEI". However, the information that indicates the "Check IMEI" information is not limited to the value of "Content-Type", and any other information in the SIP message that indicates the "Check IMEI" information can be used.

Although "Protocol Discriminator" in the body section of the SIP message indicates "Check IMEI", and therefore, HSS/MAPGW 6 uses the "Protocol Discriminator" for determination purposes as information that indicates the "Check IMEI". However, the information that indicates the "Check IMEI" is not limited to the "Protocol discriminator", and any other information in the SIP message can be used as the information that indicates the "Check IMEI".

That is, as long as information that indicates the "Check IMEI" is included in the body section of the header part of the SIP message in any form, the present invention is not limited to the configuration of the exemplary embodiment described above and can be equally implemented.

In the exemplary embodiment described above, in Cases #3 to #6 where a check result message that indicates whether a radio terminal is used in an authorized or unauthorized manner is not received from EIR 9 in response to the "Check IMEI" information, position information registration is normally performed as a quasi-normal operation. However, the criterion of determination of whether to normally perform position information registration and enable UE is not limited to the determination criterion described above, and various criteria can be used depending on the status of the network, the security policy of the network or the like.

The term "system" used in this specification refers to a logical set of a plurality of devices (or functional modules that provide specific functions) that may or may not be included in a single housing.

In particular, IPSMGW 5, HSS/MAPGW 6, VLR 61 and HLR 8 provide a predetermined function, and the configuration that provides each function may or may not be included in a single housing.

In the exemplary embodiment described above, IPSMGW 5 determines the destination based on whether the value of "Content-Type" in the received SIP message indicates SMS or Check IMEI and SS control, converts the protocol if the value indicates Check IMEI and SS control, and performs signal transmission to and reception from HSS/MAPGW 6. However, the present invention is not limited to the configuration described above as long as the determination function, the conversion function and the transmission and reception function according to this exemplary embodiment can be provided, and the present invention can be equally implemented if another device has the functions.

Figure 15:
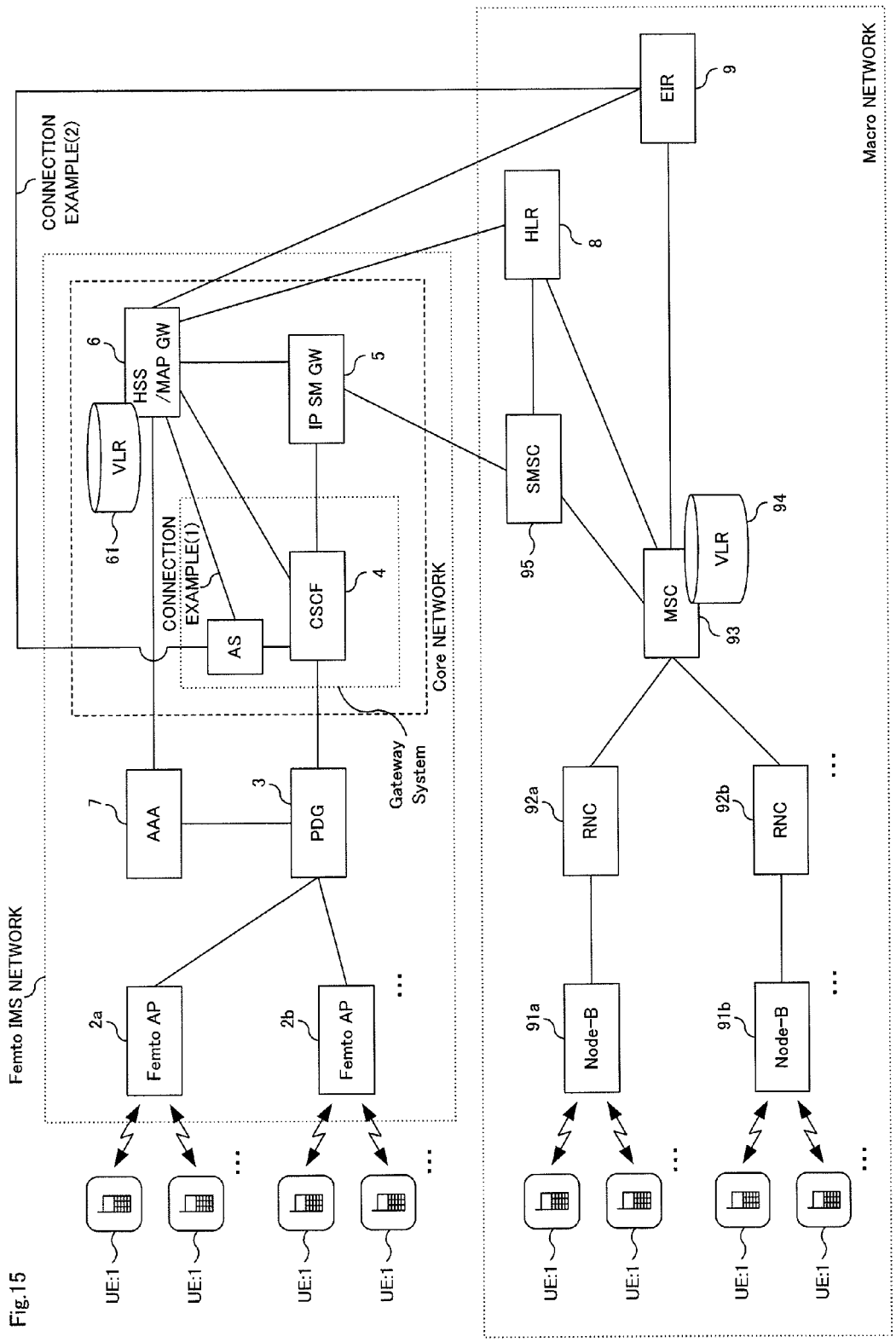
FIG. 15 is a block diagram showing another exemplary configuration of the communication system according to the exemplary embodiment.

For example, as shown by a connection example (1) in FIG. 15, CSCF 4 may perform the above-described determination of the destination by a service sorting function provided in CSCF 4 as a standard feature, and an AS (application server; converter) may control the communication with HSS/MAPGW 6, such as the protocol conversion and the transmission and reception. That is, the present invention can be equally implemented even if the determination function, the conversion function and the transmission and reception function described as the functions of the IPSMGW 5 in the above-described exemplary embodiment are provided by a gateway system comprising CSCF 4 and the AS.

Alternatively, as shown by a connection example (2) in FIG. 15, CSCF 4 may perform the determination of the destination described above, the AS may perform the communication control, such as protocol conversion, and the transmission and reception of the signal including the "Check IMEI" information may occur between the AS and EIR 9. That is, signal transmission and reception may occur between the AS and EIR 9 without intervention of HSS/MAPGW 6.

In the case of the configuration shown in FIG. 15, femto AP 2 adds some service discriminator (initial filter criteria (iFC) or the like) to the header information of the ISP message to be transmitted, thereby allowing CSCF 4 to determine the destination.

In the above description of the configuration shown in FIG. 15, the AS has the communication control function, such as the protocol conversion function and the transmission and reception function. However, as described above, the configuration serving as the converting device that provides the communication control function may be included in any housing, and CSCF 4 or HSS may include the configuration.

Figure 16:
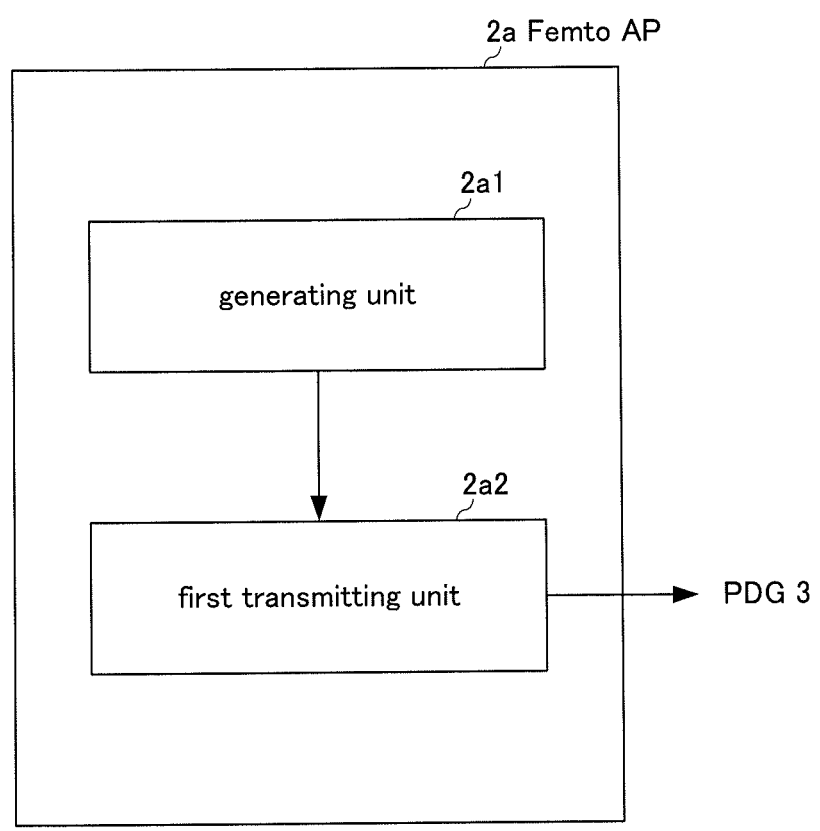
FIG. 16 is a diagram showing an example of an internal configuration of femto AP 2 shown in FIG. 2.

Femto AP 2 shown in FIG. 2 may comprise components shown in FIG. 16.

As shown in FIG. 16, femto AP 2 shown in FIG. 2 may comprise generating unit 2a1 that generates a SIP (session initiation protocol) message including a terminal ID of a radio terminal and a check request for the terminal ID at a predetermined time, and first transmitting unit 2a2 that transmits the SIP message generated by generating unit 2a1 to a higher level device (PDG 3) in the communication system.

Figure 17:
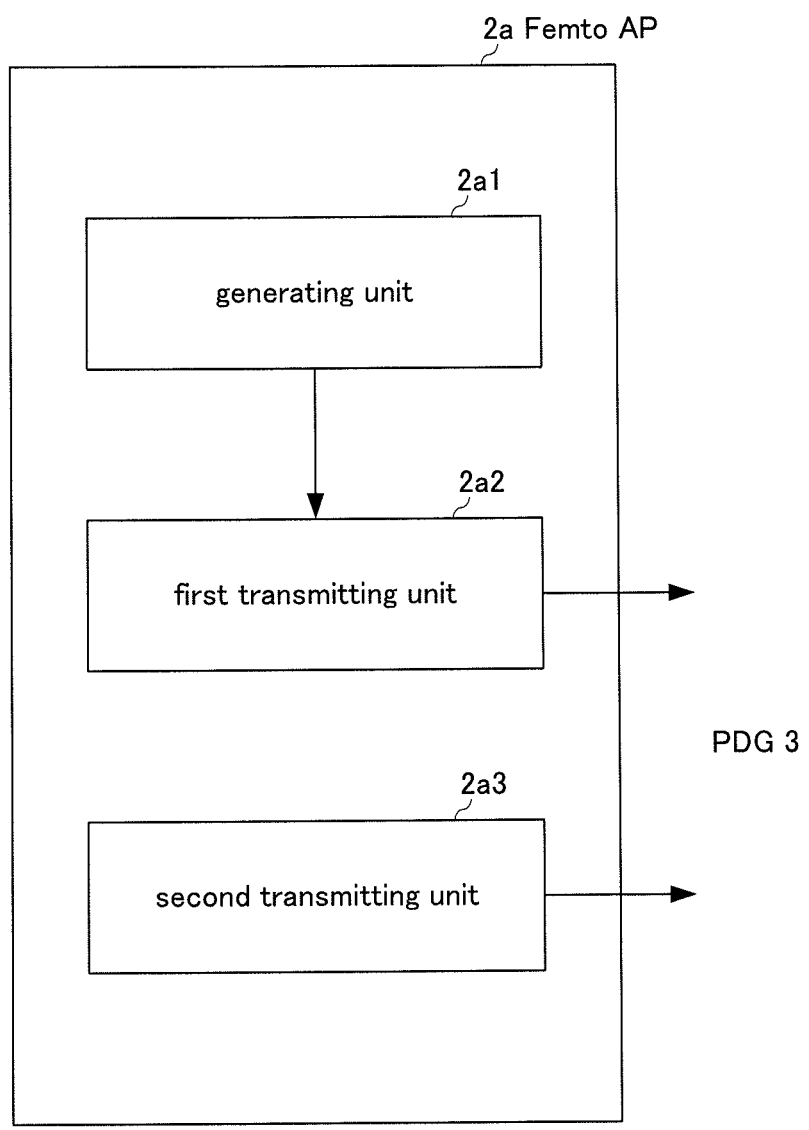
FIG. 17 is a diagram showing another example of the internal configuration of femto AP 2 shown in FIG. 2.

As shown in FIG. 17, femto AP 2 shown in FIG. 2 may further comprise second transmitting unit 2a3 that transmits a deletion request to the higher level device (PDG 3) to delete position information on a terminal ID when femto AP 2 receives an unauthorized-use notification that the check result for the terminal ID means unauthorized use of the radio terminal.

Figure 18:
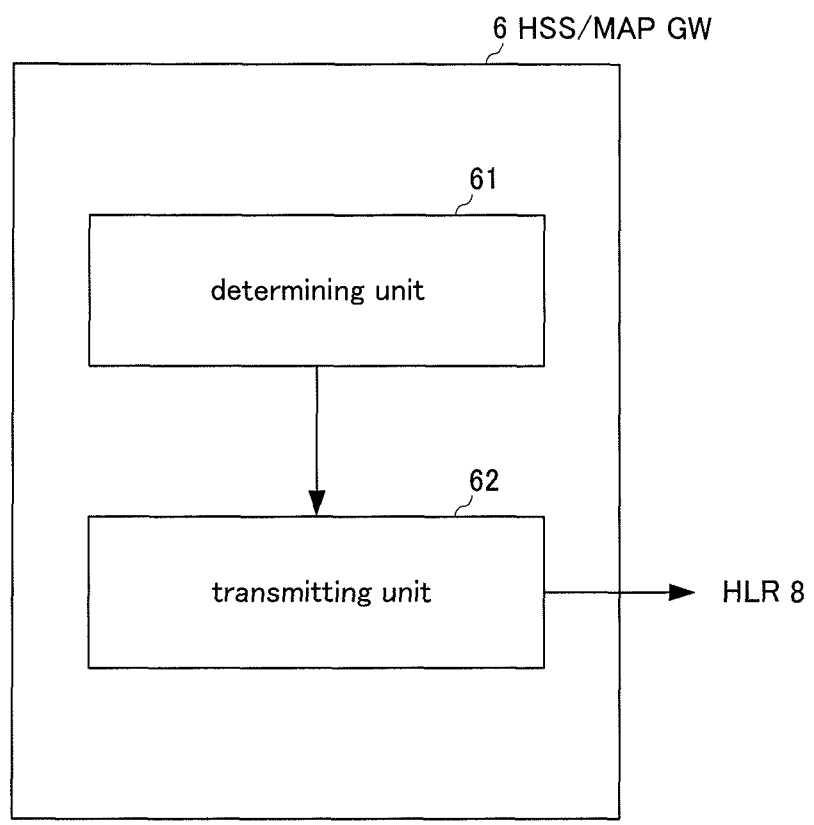
FIG. 18 is a diagram showing an example of an internal configuration of HSS/MAPGW 6 shown in FIG. 2.

HSS/MAPGW 6 shown in FIG. 2 may comprise components shown in FIG. 18.

As shown in FIG. 18, HSS/MAPGW 6 shown in FIG. 2 may comprise determining unit 61 that determines whether or not the received message includes information indicating the check request for the terminal ID, and transmitting unit 62 that transmits a message corresponding to the received message including the check request to an equipment identify register (HLR 8) in the case where determining unit 61 determines that the received message include the information indicating the check request for the terminal ID.

The procedures to implement the femto cell base station, IPSMGW (short message gateway device) and HSS/MAPGW (MAP gateway device) according to the exemplary embodiment described above may be recorded in a recording medium in the form of a program, and the functions according to the exemplary embodiment described above may be implemented by loading the program from the recording medium to a computer that constitutes the system and by making a CPU of the computer execute the program.

In this case, the present invention can be equally applied if a set of information including the program is supplied to an output device from the recording medium described above or from an external recording medium via a network.

That is, a program code itself read from the recording medium constitutes a novel feature, and the recording medium storing the program code and a signal read from the recording medium are included in the present invention.

The recording medium may be a flexible disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, or a ROM.

A program according to the present invention can make the femto cell base station, the short message gateway device and the MAP gateway device controlled by the program provide the respective functions described in the above exemplary embodiment.

The present invention has been described with regard to an exemplary embodiment. However, the present invention is not limited to the exemplary embodiment described above. Various modifications that can be made to the configurations and details of the present invention within the scope of the present invention will readily occur to those skilled in the art.

This application claims priority based on Japanese Patent Application No. 2009-170139 filled on Jul. 21, 2009, and the whole disclosure thereof is incorporated herein.

The invention claimed is:

1. A gateway system that forms a communication system having a function of checking an International Mobile Equipment Identifier (IMEI) through the use of an equipment identify register, the gateway system comprising:
   first determining means that determines which an apparatus is a destination based on whether a received SIP (session initiation protocol) message includes information indicating a check request for an IMEI or information indicating a SMS (short message service) when the gate way system receives the SIP message; and
   third transmitting means transmits content of the received SIP message to the destination determined by said first determining means,
   wherein said gateway system is formed by a short message gateway apparatus,
   said first determining means determines that a MAP (mobile application part) gateway apparatus is the destination in a case where the received SIP message includes information indicating the check request for the IMEI, and
   the MAP gateway apparatus is provided as an internal feature of a HSS (home subscriber server).

2. The gateway system according to claim 1, further comprising:
   converting means that converts the content of the received SIP message into a message according to a protocol for transmission to the destination determined by said first determining means,
   wherein said third transmitting means transmits the message according to the protocol converted by said converting means to the determined destination.

3. The gateway system according to claim 2, further comprising:
   a CSCF (call session control function) apparatus including said first determining means; and
   a converting apparatus including said third transmitting means and said converting means.

4. A communication control method in a communication system having a function of checking an International Mobile Equipment Identifier (IMEI) through the use of an equipment identify register, the communication control method comprising:
   a first determination step of determining which apparatus is a destination based on whether a received SIP (session initiation protocol) message includes information indicating a check request for an IMEI or information indicating a SMS (short message service) when a gateway system forming said communication system receives the SIP message; and
   a third transmission step of said gateway system transmitting content of the received SIP message to the destination determined in said first determination step,
   wherein said gateway system is formed by a short message gateway apparatus,
   in said first determination step, a MAP (mobile application part) gateway apparatus is determined as the destination in a case where the received SIP message includes the information indicating the check request for the IMEI, and
   the MAP gateway apparatus is provided as an internal feature of a home subscriber server (HSS).

5. The communication control method according to claim 4, further comprising:
   a conversion step of said gateway system converting the content of the received SIP message into a message according to a protocol for transmission to the destination determined in said first determination step,
   wherein in said third transmission step, the message according to the protocol produced in said conversion step is transmitted to the determined destination.

6. The communication control method according to claim 5, wherein said gateway system comprises a CSCF (call session control function) apparatus and a converting apparatus,
   said CSCF apparatus performs said first determination step, and
   said converting apparatus performs said third transmission step and said conversion step in a case where it is determined in said first determination step that the received SIP message includes the information indicating the check request for the IMEI.

* * * * *